US012705222B2

(12) United States Patent
Shi et al.

(10) Patent No.: US 12,705,222 B2
(45) Date of Patent: Aug. 11, 2026

(54) APPLICATION MANAGEMENT METHOD AND APPARATUS

(71) Applicant: ALIBABA GROUP HOLDING LIMITED, George Town (KY)

(72) Inventors: Mingwei Shi, Hangzhou (CN); Yu Ding, Hangzhou (CN); Xiaorui Wang, Hangzhou (CN); Xinyu Zhou, Hangzhou (CN); Zhanhui Li, Hangzhou (CN); Zhouxiang Zhan, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 235 days.

(21) Appl. No.: 18/453,638

(22) Filed: Aug. 22, 2023

(65) Prior Publication Data

US 2023/0394020 A1 Dec. 7, 2023

Related U.S. Application Data

(63) Continuation of application No. PCT/CN2022/076414, filed on Feb. 16, 2022.

(30) Foreign Application Priority Data

Feb. 22, 2021 (CN) ......................... 202110197564.9

(51) Int. Cl.
*G06F 16/00* (2019.01)
*G06F 16/22* (2019.01)
*G06F 16/25* (2019.01)

(52) U.S. Cl.
CPC ........ *G06F 16/2228* (2019.01); *G06F 16/252* (2019.01)

(58) Field of Classification Search
CPC .................................................... G06F 16/252
See application file for complete search history.

(56) References Cited

U.S. PATENT DOCUMENTS

2008/0243968 A1 10/2008 Schmelter et al.
2010/0223429 A1 9/2010 Cher et al.
(Continued)

FOREIGN PATENT DOCUMENTS

CN 104809237 A 7/2015
CN 104915151 A 9/2015
(Continued)

OTHER PUBLICATIONS

European Patent Office Communication issued for Application No. 22755540.6 the Supplementary European Search Report (Art. 153(7) EPC) and the European search opinion dated Jul. 5, 2024, 12 pages.
(Continued)

*Primary Examiner* — Ajith Jacob
(74) *Attorney, Agent, or Firm* — Finnegan, Henderson, Farabow, Garrett & Dunner, LLP

(57) ABSTRACT

An application management method includes collecting a plurality of objects in an application instance used for serverless computing and generating a base tree according to a reference hierarchical relationship of the plurality of objects; performing internal memory object rearrangement on a plurality of application instances according to the base tree; and performing internal memory merging on the plurality of rearranged application instances.

19 Claims, 8 Drawing Sheets

(56) References Cited

U.S. PATENT DOCUMENTS

| | | | |
|---|---|---|---|
| 2018/0254998 A1 | 9/2018 | Cello et al. | |
| 2020/0034288 A1 | 1/2020 | Kennke et al. | |
| 2020/0081745 A1 | 3/2020 | Cybulski et al. | |
| 2021/0263779 A1* | 8/2021 | Haghighat | G06F 9/5061 |

FOREIGN PATENT DOCUMENTS

| | | |
|---|---|---|
| CN | 109086135 A | 12/2018 |
| CN | 113296883 A | 8/2021 |
| CN | 113296923 A | 8/2021 |
| WO | 0195231 A2 | 12/2001 |

OTHER PUBLICATIONS

Mohan et al., "Agile Cold Starts for Scalable Serverless," retrieved from the internet: URL: https://www.usenix.org/system/files/hotcloud19-paper-mohan.pdf, 6 pages, 2019.

Puaut, Isabelle, "A Distributed Garbage Collector for Active Objects," ACM Sigplan Notices, Association for Computing Machinery, pp. 113-128, 1994.

Stenbom et al., "Refunction: Eliminating Serverless Cold Starts Through Container Reuse," Meng Individual Project, Department of Computing, Imperial College London, 62 pages, 2019.

International Search Report and Written Opinion in PCT/CN2022/076414, mailed Apr. 28, 2022, 16 pages.

Office Action in CN202110197564.9, mailed Jan. 28, 2023, 6 pages.

* cited by examiner

Computing device 1100

Memory 1110

Processor 1120

APPLICATION MANAGEMENT METHOD AND APPARATUS

CROSS-REFERENCE TO RELATED APPLICATIONS

The disclosure claims the benefits of priority to PCT Application No. PCT/CN2022/076414, filed on Feb. 16, 2022, which claims the benefits of priority to Chinese Application No. 202110197564.9, filed Feb. 22, 2021, both of which are incorporated herein by reference in their entireties.

TECHNICAL FIELD

The present disclosure relates to the field of serverless computing, in particular to an application management method and apparatus.

BACKGROUND

Serverless computing, also called function-as-a-service, is a model for cloud computing. On the basis of platform-as-a-service, serverless computing provides a micro architecture, with which it is not necessary for terminal clients to deploy, configure or manage server services, and server services required for code running are all provided by a cloud platform. In the current cloud computing distributed environment, serverless computing is popular as it can make application developers focus on products without concerning about running states of applications on local or cloud servers.

In order to deal with the change of the service request flow, it is required to increase application running instances from one instance to a plurality of instances, or decrease a plurality of copies to fewer copies, the processes of increase and decrease may be referred to as expansion and contraction respectively, and the capability of expansion and contraction is collectively called elasticity.

Under a serverless computing elastic scenario, cold-starting of applications consumes long time, which cannot meet the requirement for rapid expansion. In order to provide the higher quality of service for users, typically, a certain number of instances (e.g., a Java service instance) need to be started in advance to be in a standby state, so as to deal with the requirement for rapid expansion under the flow change. These instances in the standby state do not accept an external request connection at ordinary times, or participate in external services, but occupy a large amount of system resources, which leads to serious system resource waste.

Therefore, a modified application management scheme is required.

SUMMARY OF THE DISCLOSURE

Embodiments of the present disclosure provide an application management method. The method includes: collecting a plurality of objects in an application instance used for serverless computing and generating a base tree according to a reference hierarchical relationship of the plurality of objects; performing internal memory object rearrangement on a plurality of application instances according to the base tree; and performing internal memory merging on the plurality of rearranged application instances.

Embodiments of the present disclosure provide an apparatus for application management. The apparatus includes a memory configured to store instructions; and one or more processors configured to execute the instructions to cause the apparatus to perform: collecting a plurality of objects in an application instance used for serverless computing and generating a base tree according to a reference hierarchical relationship of the plurality of objects; performing internal memory object rearrangement on a plurality of application instances according to the base tree; and performing internal memory merging on the plurality of rearranged application instances.

Embodiments of the present disclosure provide a non-transitory computer readable medium that stores a set of instructions that is executable by one or more processors of an apparatus to cause the apparatus to perform operations. The operations include: collecting a plurality of objects in an application instance used for serverless computing and generating a base tree according to a reference hierarchical relationship of the plurality of objects; performing internal memory object rearrangement on a plurality of application instances according to the base tree; and performing internal memory merging on the plurality of rearranged application instances.

BRIEF DESCRIPTION OF THE DRAWINGS

Embodiments and various aspects of the present disclosure are illustrated in the following detailed description and the accompanying figures. Various features shown in the figures are not drawn to scale. Identical reference numerals generally represent identical components in the exemplary implementations of the present disclosure.

DETAILED DESCRIPTION

Figure 1:
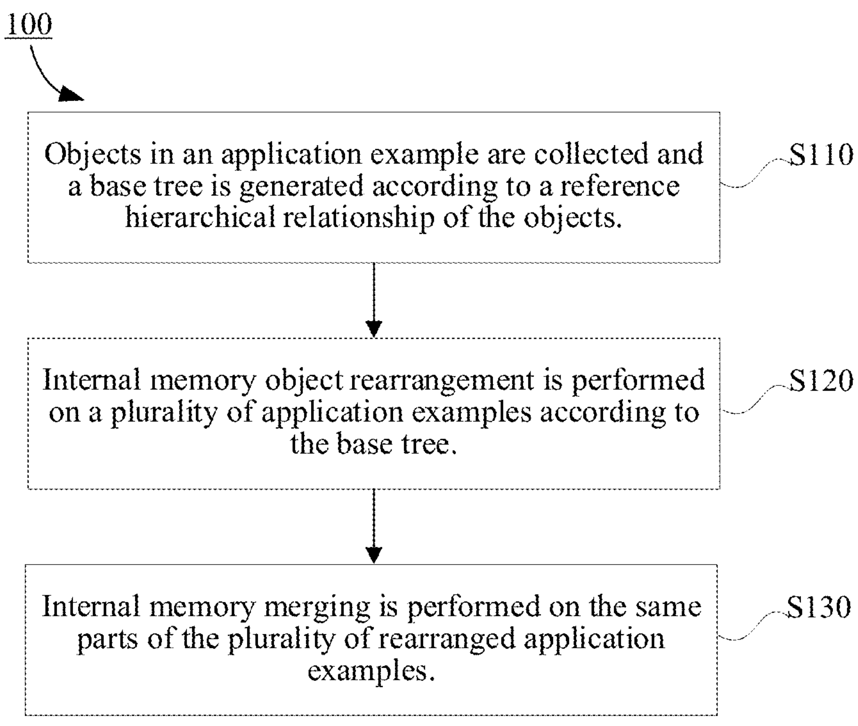
FIG. 1 shows a schematic flowchart of an exemplary application management method for serverless computing, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

As stated above, serverless computing is popular as it can make application developers focus on products without concerning about running states of applications on local or cloud servers. Under a serverless computing elastic scenario, cold-starting of applications consumes long time, which cannot meet the requirement for rapid expansion. In order to provide the higher quality of service for users, typically, a certain number of instances (e.g., a Java service instance) need to be started in advance to be in a standby state, so as to deal with the requirement for rapid expansion under the flow change. These instances in the standby state do not accept an external request connection at ordinary times, or participate in providing services, but occupy a large amount of system resources, which leads to serious system resource waste.

At present, under a part of systems or environments, in order to achieve rapid starting and maximum-extent resource sharing of Java instances, typically, a new process is created with the Fork or Clone technology by a bottom layer. For instance, creation of other running instances is achieved by Fork of a main process of a Zygote framework, which is commonly used in the Android system, and finally the purposes of rapid starting and resource sharing of the running instances are achieved.

However, for traditional Java applications, running instances that are newly created by utilizing Fork/Clone may have a state problem, especially for some Java background service programs, a plurality of instances may have the same IP or UUID (Universally Unique Identifier) or other information, which is unacceptable in a real production environment. Meanwhile, in such method, after running a program, the internal memory is contaminated and cannot return to a previous shared state. In addition, to utilize Fork/Clone, it is required to complete shared parts before calling of Fork/Clone as far as possible, and then the newly Forked running instance can share resources with a parent process to the maximum extent. For traditional Java applications, on the one hand, the proportion of resources is small, on the other hand, logics and code processes of programs need to be reconstructed to put some common logics ahead, and for existing applications, the difficulty of code reconstruction and transformation is significant.

In consideration that instances which are started in advance usually have the similar running context (e.g., JVM running context), in the present disclosure, as for application instances, especially for sorting and rearrangement for an instance heap internal memory area (e.g., Java Heap), a plurality of similar running instances can achieve internal memory sharing to the maximum extent. Therefore, occupation of instances in a standby state on system resources is reduced, and the average utilization rate of the resources is increased. Meanwhile, it also means that, under the same system resources, more running instances may be started to be in a standby state or running instances of other applications may be started, to deal with a rapid elastic expansion scenario.

FIG. 1 shows a schematic flowchart of an application management method 100 for serverless computing, according to some embodiments of the present disclosure. Application management method 100 is especially suitable for being implemented as a millisecond-level application elastic method based on multi-process internal memory sharing. "Elastic" refers to expansion and contraction of applications, where expansion may refer to a process that the applications are changed from a low power consumption state to a state of receiving full flow, and contraction may refer to a process that the applications are changed from receiving flow to a standby running instance. Elasticity may be divided into vertical elasticity and horizontal elasticity. Vertical elasticity means that expansion and contraction occur on the same host, and horizontal elasticity means that expansion and contraction occur across hosts. In order to achieve elastic and rapid expansion and contraction of serverless computing and shorten service response time, in some cases, running instances of a plurality of applications need to be prepared in advance to be in a standby state. Application management method 100 of the present disclosure especially focuses on the serverless computing elastic scenario.

At step S110, objects in an application instance are collected and a base tree is generated according to a reference hierarchical relationship of the objects. At step S120, internal memory object rearrangement is performed on a plurality of application instances according to the base tree. That is, data in internal memories corresponding to the application instances (the data may represent the objects in the application instances) are rearranged according to the order and hierarchical structure of the objects in the base tree. At step S130, internal memory merging is performed on the same parts of the plurality of rearranged application instances to enable the plurality of application instances to enter into a low power consumption state.

Due to the similarity of the plurality of application instances (e.g., a plurality of application instances started for the same application), although the plurality of application instances may have different object orders for many reasons in the starting process, the contained objects (e.g., root objects of a top layer) and a reference relationship of the objects are highly similar or identical. Therefore, at step S120, the objects (and the reference relationship thereof) in the application instances may be rearranged based on the same base tree, thereby making internal memory physical pages highly identical. Then, the same data parts of the application instances can be merged at step S130, for instance, only one copy is reserved, and other application instances can directly copy content of this reserved copy during expansion.

Therefore, a contraction state of serverless computing is achieved through hierarchical sorting and internal memory merging for the objects in the plurality of similar application instances.

In a serverless computing scenario, the application instances typically may be implemented as JVM application instances. Each instance may be cold-started initially and correspond to one process. "Cold-starting" refers to an application starting process that process running resources are allocated to a process of one application from an initial state, including links such as loading program codes by a computer, starting the process, experiencing code loading completely and initializing the program.

"The plurality of application instances" include one application instance in which the objects are collected and the base tree is generated at step S110 and a plurality of other application instances (i.e., "similar application instances") similar to the application instance. Since all these application instances include similar objects and object reference relationships, internal memory rearrangement at step S120 and internal memory merging at step S130 may be performed based on the object order and reference hierarchical relationship in the base tree.

The "similar application instances" especially may be application instances for the same application, such as one hundreds (100) application instances (processes) of the same shopping application A. In some embodiments, the similar application instances may be similar JVM running instances. For the same JAVA application, a plurality of running instances having the same configuration and same runtime parameters or a plurality of running instances in which only few running parameters are different (e.g., different in IP, port and other information of applications) may be generated after multiple times of starting. Herein, a plurality of such JVM instances may be referred to as a plurality of similar JVM running instances. Each instances of these instances runs in an independent process context and has an independent virtual address space. Since these instances are different in starting time and different in runtime environment and system resource of a system in a starting process, and due to uncertainty of asynchronous operations during running of a code logic (such as network connections and remote process calling) and uncertainty of runtime states such as the opportunity of JVM GC in a running process of a JAVA program, the contexts are not consistent when the plurality of JVM running instances run. However, the running codes, runtime parameters and the running logic of the codes are almost the same. These instances are called the similar JVM running instances. By utilizing the similarity of these running instances, a contraction state in which extremely few internal memory resources are occupied is achieved, and the contraction state may be expanded at a millisecond level to an online state in which service users make requests with full flow.

Massive objects exist in the started application instances, considering that the similar application instances are almost the same in running codes, runtime parameter and running logic of the codes, in the present disclosure, by collecting the objects in the application instance and generating the base tree according to the hierarchical relationship, internal memory sorting may be performed on all the similar application instances based on the base tree, and internal memory merging may be performed accordingly, so that these application instances occupy extremely few internal memory resources in the standby state (i.e., low power consumption state), and can be rapidly and elastically expanded to the online state.

Figure 2:
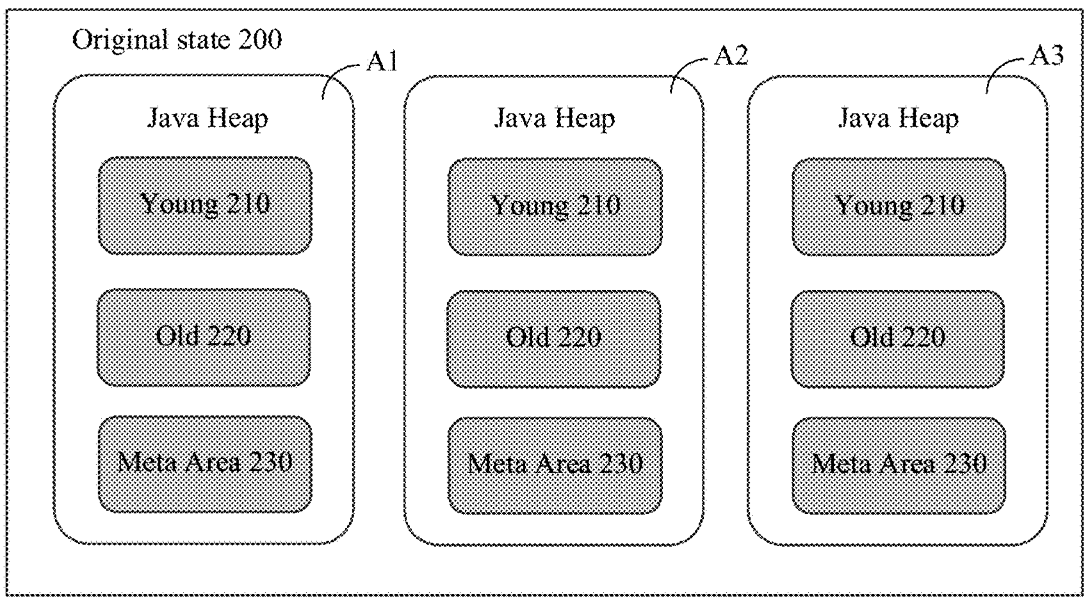
FIG. 2 shows a schematic diagram of an exemplary JVM (Java Virtual Machine) internal memory after cold-starting of a plurality of application instances, according to some embodiments of the present disclosure.

The application instances need a starting process. Before step S110, the plurality of application instances may be cold-started. For instance, the plurality of running instances are started for the same application. FIG. 2 shows a schematic diagram of a JVM internal memory after cold-starting of the plurality of application instances, according to some embodiments of the present disclosure.

As shown in FIG. 2, three running instances A1, A2 and A3 are cold-started for the same application. In the original state 200 as shown, each running instance (A1, A2, and A3) includes one JAVA Heap. Each heap includes a Young Area 210, an Old Area 220, and a Meta Area 230.

Figure 3:
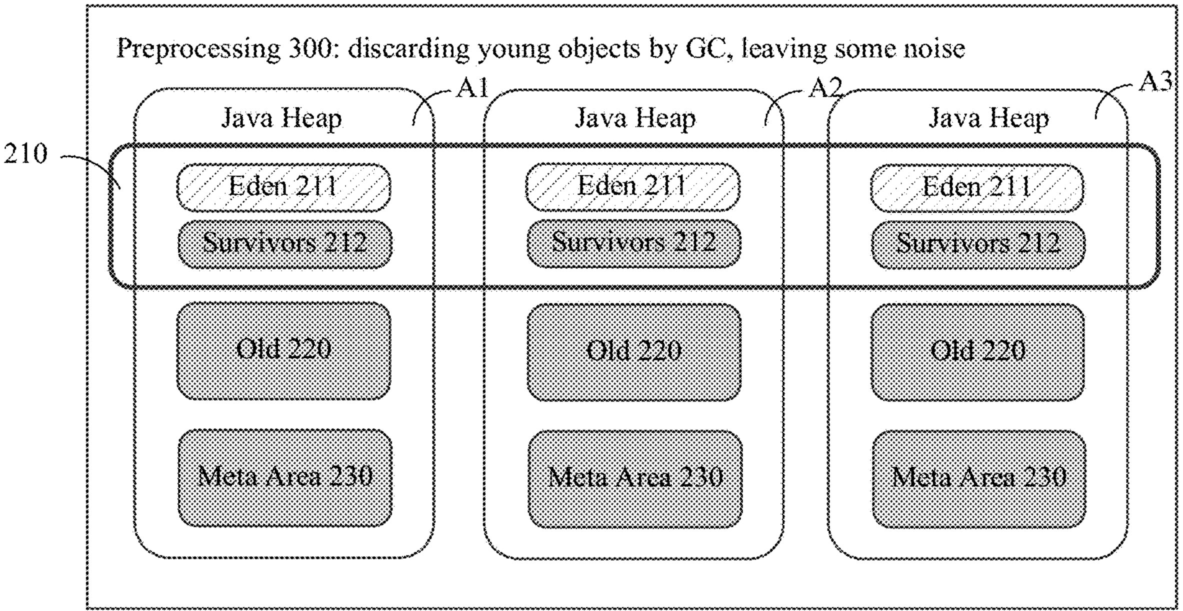
FIG. 3 shows a schematic diagram of an exemplary JVM internal memory after an FGC (full garbage collection) operation, according to some embodiments of the present disclosure.

After cold-starting, an in-heap garbage recovery operation may be performed on the plurality of application instances and temporary objects may be released. GC processing, especially full GC (FGC) processing for the whole heap, may be performed on each JAVA Heap. FIG. 3 shows a schematic diagram of a JVM internal memory after an FGC operation, according to some embodiments of the present disclosure. As shown in FIG. 3, after FGC preprocessing, most temporary objects in an Eden Area 211 may be recovered. At this moment, the Young Area 210 further includes survivors 212 (in some cases, the survivors 212 may be further segmented into an area S0 and an area S1 (not shown)).

A class data sharing operation may be performed for the Meta areas in FIG. 2 and FIG. 3 to achieve internal memory sharing across the instances. For instance, for a JVM instance in a hot standby state, an App class data sharing (CDS) technology may be enabled during starting, so as to perform internal memory sharing on the Meta Area 230 of the JVM instance.

Figure 4:
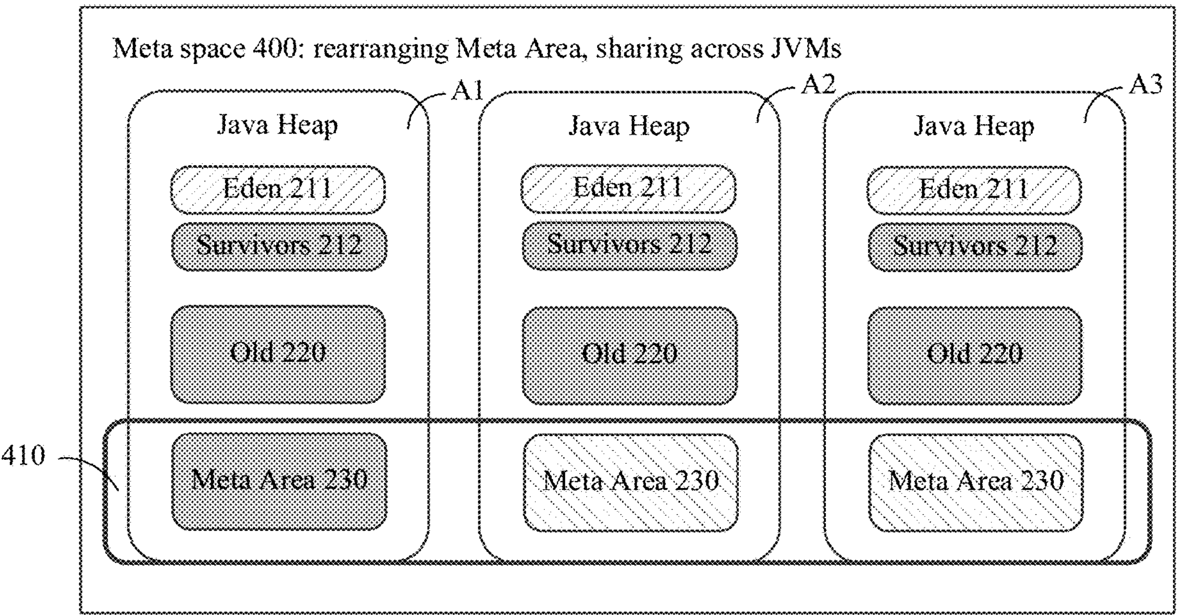
FIG. 4 shows a schematic diagram of an exemplary internal memory shared across JVMs after rearrangement of a meta area, according to some embodiments of the present disclosure.

FIG. 4 shows a schematic diagram of an internal memory shared across JVMs after rearrangement of the Meta Area 400, according to some embodiments of the present disclosure. Rearrangement may be performed on the Meta Area 230 according to classes, and sharing across JVMs 410 is achieved after rearrangement. Therefore, the Meta Area 230 is changed in this stage, so that a Kclass field in an object header of the Old Area 220 needs to be modified to achieve the internal memory sharing operation for the Meta Area 230 by utilizing the CDS technology.

It is to be understood by those skilled in the art that, although it is not shown in FIG. 2 to FIG. 4, there may also be out-of-heap areas in the JVM internal memory in addition to the in-heap areas, such as a thread area including a register, a JVM stack and a local method stack.

In some embodiments, after performing FGC preprocessing and after optionally performing rearrangement and sharing on the Meta Area 230, base tree construction and internal memory object rearrangement and merging operations as in steps S110 to S130 are performed. The base tree construction and internal memory object rearrangement and merging operations in steps S110 to S130 are especially suitable for being performed in Survivors Area 212 and Old Area 220.

In some embodiments, after Young Area 210 and Meta Area 230 are processed, the Survive Area 212 and the Old Area 220 (the areas with the maximum proportion in the internal memory in the JVM Heap) of the JVM instance may be processed. One JVM instances is selected from a group of similar JVM instances. For internal memory corresponding to the selected JVM instance, it is sorted using a creative heap alignment operation (corresponding to steps S110 and S120) of the present disclosure, and then sorted meta information is exported (for instance, in a form of a base tree) to be used as reference information for sorting same internal memory areas of other similar JVM instance.

The heap alignment operation of the present disclosure may be regarded as a GC-enhanced algorithm, heap objects may be sorted transparently in the GC process, and internal memory data of heap areas of the plurality of similar JVM instances are made consistent as much as possible. The main purpose of the heap alignment operation is to shield or shrink a range of internal memory inconsistency of the plurality of JVMs by sorting the objects in the heaps. The premise of the above operation of the present disclosure is that the internal memory data in different JVM processes of the same application are basically consistent. If the difference between two heaps is large, the effect of the alignment operation will deteriorate.

Since the heap alignment operation is preferably performed after FGC, most temporary objects in Eden Area 211 have been recovered first by FGC. Therefore, step S110 that collecting the objects in the application instances and generating the base tree according to the reference hierarchical relationship of the objects further includes: collecting surviving objects in a heap after releasing the temporary objects, and generating the base tree according to the hierarchical relationship. Top-layer objects surviving in the heap may be collected as a first layer of the base tree; objects that are directly referenced by objects of the first layer are collected as a second layer of the base tree; and the operation is repeated until a final layer. The top-layer objects are typically defined as root objects in the JVM, and are generally system objects or objects in a Permanent Generation.

In some embodiments, in the execution process of the heap alignment operation, all surviving top-layer objects in the JVM Heap may be collected first according to a breadth first search (BFS) algorithm, including objects directly referenced by in-heap GC roots or out-of-heap GC roots. The objects collected in the second layer are objects directly referenced by the objects of the first layer, the objects collected in the third layer are objects directly referenced by the second layer, and so on. Finally, objects in the Survive Area 212 and the Old Area 220 are collected to form storage objects that are in accordance with the reference hierarchy. After the surviving objects are collected, addresses of all the objects may be gathered in the tree and a hierarchical relationship is obtained. However, contents of the objects are still scattered in the whole heap. Then, the objects in the heap will be rearranged by running a heap sorting algorithm, and at the same time, hierarchical data used for guiding rearrangement are exported for performing internal memory sorting on other similar JVM instances according to this information.

Figure 5:
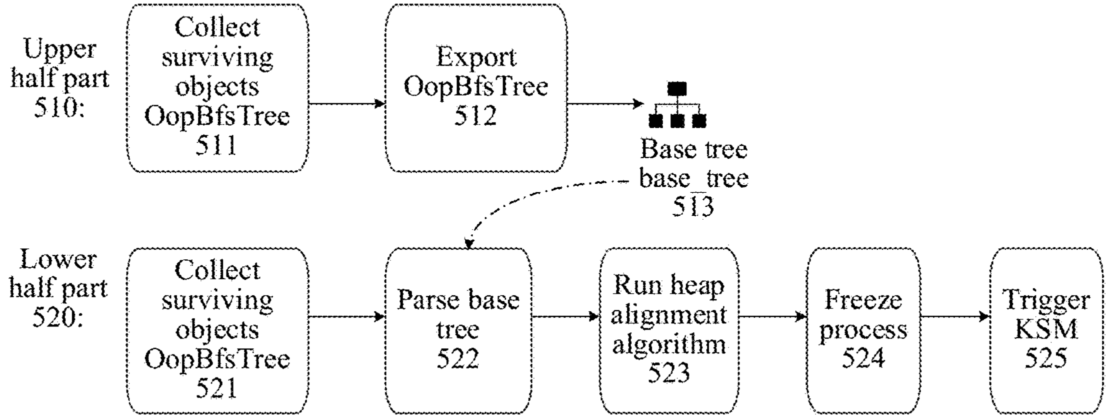
FIG. 5 shows execution steps of an exemplary heap alignment operation, according to some embodiments of the present disclosure.

FIG. 5 shows exemplary execution steps of a heap alignment operation, according to some embodiments of the present disclosure. As shown in FIG. 5, an upper half part 510 is mainly used for collecting surviving object layout information of a reference process and generating a BFS tree (OopBfsTree: Object-Oriented Programming BFS tree) 511, and then exporting this data structure (OopBfsTree) 512 to obtain a base tree (base tree) 513. The base tree may, as described above, include the addresses and the hierarchical relationship of the objects. In some embodiments, the base tree may only contain meta data of each class area of each layer, such as the number and sizes of the objects, without containing the addresses of the objects.

In the process of a lower half part 520, internal memory sorting (i.e., internal memory object rearrangement and merging based on the base tree) may be performed on other processes through the base tree obtained in the upper half part by utilizing a heap alignment operation. As shown in FIG. 5, in lower half part 520, after collecting surviving object layout information of a reference process and generating a BFS tree 521, JVM heap sorting (heap sorting algorithm) 523 may be performed on a plurality of process instances according to the same base tree 522, the process is frozen after sorting 524, and then internal memory scanning and merging are performed, for instance, by triggering KSM (Kernel Samepage Merging) 525.

As described above, in the JVM internal memory, there may also be the out-of-heap areas in addition to the in-heap areas. The out-of-heap areas include a thread area. Each thread may include:

- a PC Register: also called a program register, used for recording instruction information that is currently executed by each thread. Therefore, which instruction the thread is currently executing and which instruction shall be used next may be obtained.
- a JVM Stack: also called a virtual machine stack, used for recording a local variable, a method return address and the like in each frame. Every time a method is called in a thread, a frame will be created, and the frame is destroyed when calling of the method is ended.
- a Native Method Stack: a local (native) method stack, which is an internal memory area required when a native local method of an operating system is called.

The three types of areas described above are the same in life cycle and thread. When a thread is created, an internal memory is allocated to corresponding areas, and when the thread is destroyed, the corresponding internal memory is released.

A heap internal memory area used for executing the heap alignment operation of the present disclosure is shared by all threads. The heap internal memory area, also a main station of GC, is used for storing instances objects of classes, array instances and the like.

In addition to the heap internal memory area, an area shared by all the threads further includes a method area, and the like. The method area is mainly used for storing definitions of class structures and class members, static members and the like. The method area includes a Runtime Constant Pool, which is typically used for storing character strings, values within a range of integer between −128 to 127, and the like. According to the specification, a specific implementation of the method area may be determined based on a JVM implementation. Thus, logically, the method area may also be regarded as a part of a heap area. The heap area and the method area are both created when a virtual machine is started, and are released when the virtual machine exits.

It can be seen from the above that, the JVM internal memory area includes the thread areas and the heap area shared by the thread areas. Therefore, (a contraction part of) an application management scheme of the present disclosure may also include performing frame recovery on threads of the similar application instances.

Further internal memory recovery may be carried out on internal thread frames of a JVM in a standby state after the heap area internal memory thereof is processed. For instance, stack information related to internal threads of a standby instance of the JVM may be exported by achieving an extended JCMD (JVM Command), and register information of a thread context is obtained by utilizing Ptrace system call, so that stacks of the threads are recovered. In the serverless computing scenario of the present disclosure, for some large applications in the e-commerce field, up to 400 threads exist in a Java process, and an internal memory space of about 50 M may be saved typically through frame recovery.

Figure 6:
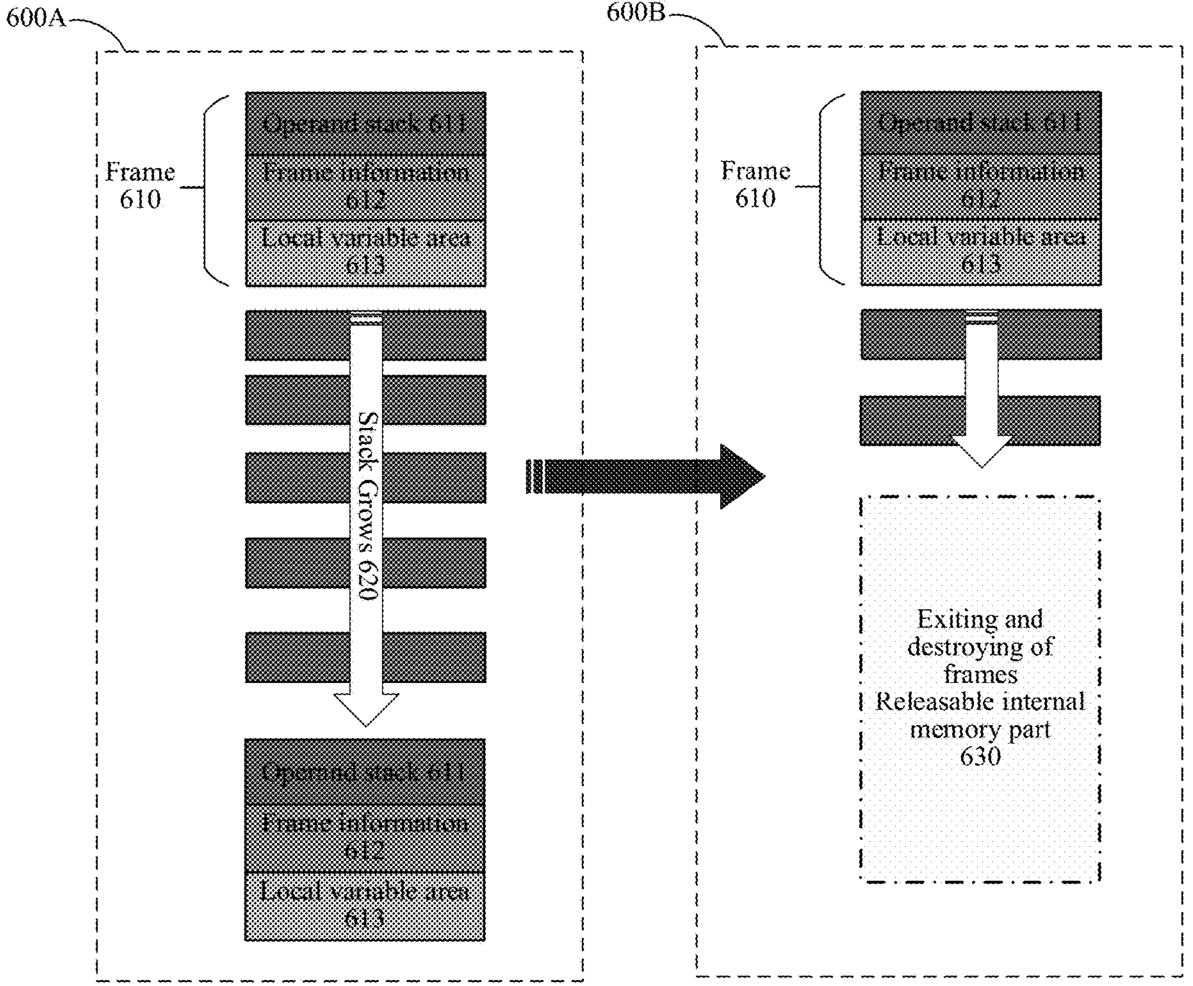
FIG. 6 shows an exemplary instance of frame recovery, according to some embodiments of the present disclosure.

FIG. 6 shows an exemplary instance of frame recovery, according to some embodiments of the present disclosure. As shown in FIG. 6, each frame 610 includes an operand stack 611, frame information 612 and a local variable area 613. Every time a method is called in a thread, a frame 610 will be created, and the frame 610 is destroyed when calling of the method is ended. Therefore, in the cold-starting process, the frame of each thread will grow 620 to a certain extent as shown in the left side 600A in FIG. 6. Through frame recovery, popping of most threads may be achieved after the process is started, thereby achieving exiting and destroying of the frames and releasing the internal memory of the exiting part 630 as shown in the right side 600B in FIG. 6.

Internal memory merging may be performed on the above sorted internal memory. Therefore, step S130 may include: performing internal memory labeling on the similar application instances subjected to internal memory object rearrangement in a designated heap area; and enabling kernel internal memory sharing to trigger internal memory sharing between the similar application instances.

In computing, Kernel Samepage Merging (KSM) (also called kernel internal memory sharing, internal memory merging, internal memory repeated data deletion and page repeated data deletion) is a kernel function, which enables a virtual machine management program system to share internal memory page flows having the same content or virtual visitors between a plurality of internal memories. Despite of direct linkage, kernel-based virtual machines (KVM) may use KSM to merge internal memory pages occupied by the virtual machines.

KSM executes internal memory repeated data deletion by scanning physical pages having the same content in a main internal memory, and identifies virtual pages mapped to these physical pages. One page is reserved to be kept unchanged, each repeated page is re-mapped to point to the same physical page, and then redundant physical pages are released for reuse. Two virtual pages are further both labeled as "copy-on-write" (COW), so that a kernel will automatically re-map the virtual pages back to having own separate physical pages after any process begins automatic write into the kernel.

In the present disclosure, after completing the above steps of FGC, heap alignment, frame release and the like, Madvise internal memory labeling may be launched for a designated JVM heap stack area through the extended JCMD command or via a Ptrace manner, and then kernel working threads are merged by enabling KSM, to trigger the designated JVM internal memory area for internal memory merging, so as to achieve internal memory sharing of the plurality of standby JVM instances.

After the plurality of internal memory sorting steps, one JVM instance in the standby state can be cached with extremely low system resources, thereby guaranteeing that more Java instances may be cached with the same resources to be used for rapid expansion.

Figure 7:
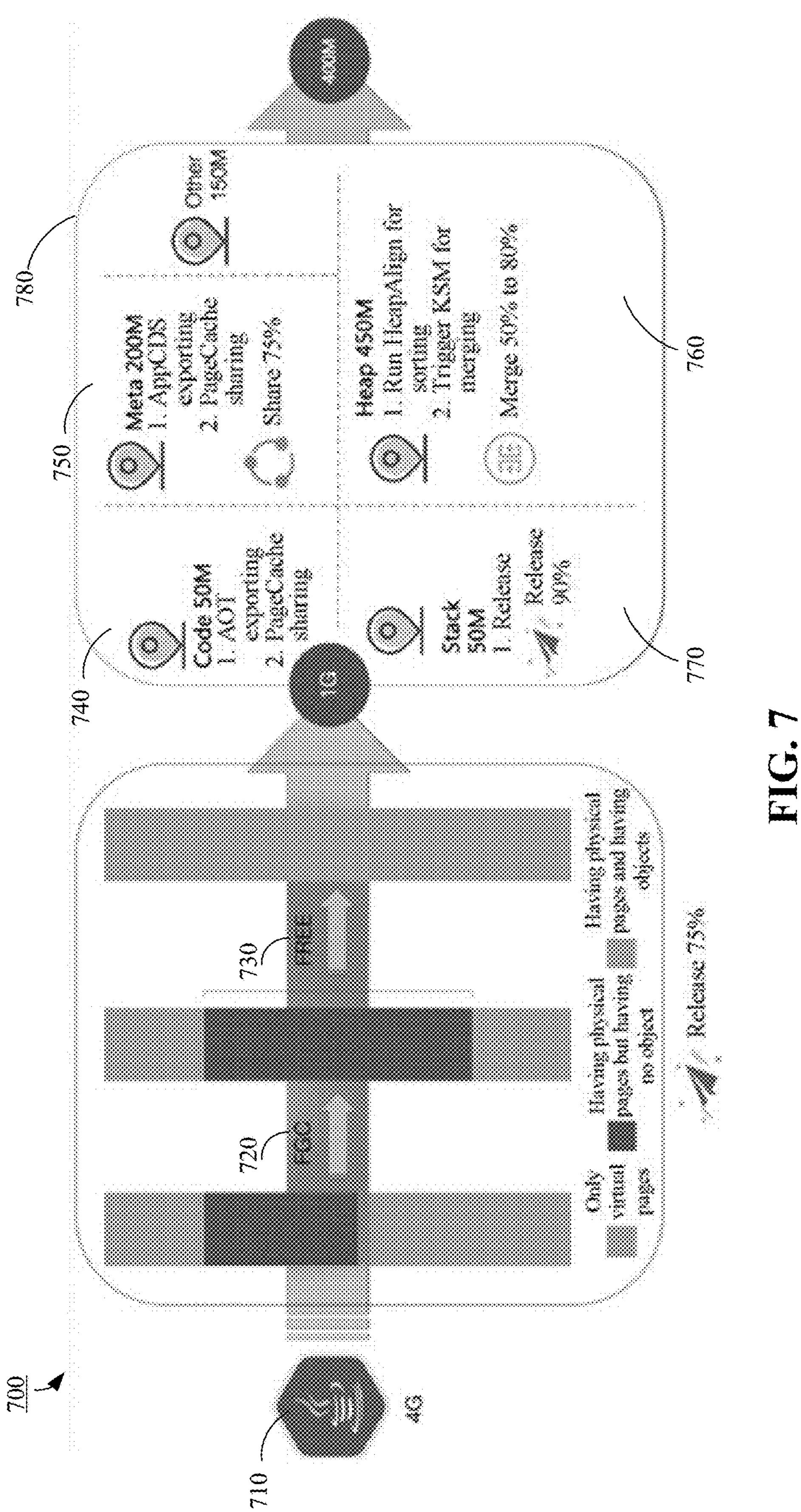
FIG. 7 shows an exemplary instance of lowering internal memory consumption of an application instance, according to some embodiments of the present disclosure.

FIG. 7 shows an exemplary instance 700 of lowering internal memory consumption of an application instance, according to some embodiments of the present disclosure. As shown in FIG. 7, a cold-started Java running instance 710 needs to occupy, for instance, an internal memory of 4G. Afterwards, full GC 720 is performed on a JVM internal memory area, a part of area having physical pages and having objects is recovered as an area having physical pages but having no object (typically located in the Java Heap area, especially the Eden area), and internal memory releasing 730 is performed via releasing processing.

After FGC 720 and releasing 730, the internal memory occupied by the Java running instance 710 is changed to 1G. Afterwards, internal memory sharing or releasing may be performed for one or more of a Code area, a Meta area, a Heap area and a Stack area. Since these areas are mapped in different areas of the internal memory, the above processing may be performed relatively independently as shown.

For instance, AOT (Ahead of Time) exporting may be performed on the Code area 740 of about 50 M, and PageCache sharing is performed. AppCDS (Application Class-Data Sharing) exporting may be performed on the Meta area 750 of about 200 M and PageCache sharing is performed to achieve internal memory void of about 75%. The heap alignment operation as described above may be executed on the Heap area 760 of about 450 M to perform object-based sorting, and KSM internal memory merging is performed on the sorted Heap area 760 to merge 50% to 80% of the internal memory space. In addition, internal memory recovery may be performed on the Stack area 770 based on frame recovery, to release about 90% of the internal memory.

Due to the existence of other internal memory spaces 780 of about 150 M, one application instance which is compressed as described above may occupy the space of 400 M.

Therefore, in the present disclosure, by designing a whole set of millisecond-level application elastic scheme based on multi-process internal memory sharing, and by utilizing the JVM CDS (Class Data Sharing) technology, an internal memory heap alignment algorithm and thread stack recovery, with the aid of the KSM internal memory merging technology, a plurality of surviving instances of the same application can occupy extremely few system resources, and millisecond-level elastic expansion of the application instances can be achieved with a low resource cost.

In some embodiments, the present disclosure may also be implemented as an internal memory sorting method, including: performing a garbage recovery operation on an application instance used for serverless computing; performing an internal memory object rearrangement operation based on a base tree for the application instance subjected to garbage recovery, where the base tree is generated by collecting objects in the current application instance or similar application instances of the current application instance and according to a hierarchical relationship; and performing an internal memory merging operation on the application instance subjected to internal memory object rearrangement. In addition to the internal memory merging operation of KSM based on the heap alignment operation, the internal memory sorting method may further include the following operations shown in FIG. 7: performing meta area internal memory sharing by utilizing class data sharing; releasing a stack area internal memory through frame recovery; or exporting codes to perform page cache sharing.

Therefore, contraction of the application instance may be achieved. Afterwards, in an expansion stage, the COW function of KSM as described above may be utilized to re-map the merged virtual pages as own separate physical pages to restore an online state of the application instance, which may also be called a full flow receivable state.

The internal memory sorting and compressing schemes performed for similar application instances of the same application are described in combination with FIG. 1 to FIG. 7. Further, the application management method of the present disclosure may also be operated for a plurality of respective similar application instances of different applications. Therefore, in some embodiments, the method may further include: adding respective application instances of different applications as the similar application instances into one application group; and performing the internal memory merging operation on each group (i.e., a plurality of application instances in each group) of a plurality of application groups.

In practical use, a KSM internal memory merging algorithm grouping in accordance with processes may be introduced, in which internal memory merging is performed by adding a plurality of application instances of the same application into one application group. Specifically, after a Survive area and an Old area of a selected JVM instance in each group are sorted, object hierarchy meta data information collected through the above heap alignment algorithm may be exported. Object rearrangement is performed on other JVM running instances in a code state within this group by utilizing exported object hierarchical data, and internal memory merging is performed according to groups.

Figure 8:
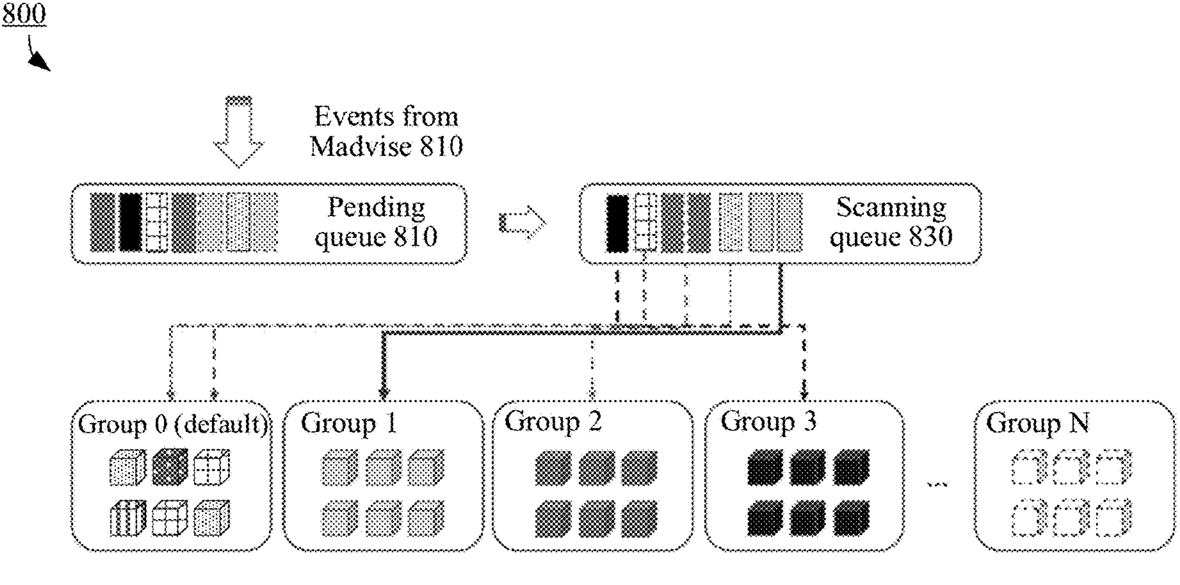
FIG. 8 shows an exemplary instance of performing internal memory merging based on application groups, according to some embodiments of the present disclosure.

FIG. 8 shows an exemplary instance 800 of performing internal memory merging based on application groups, according to some embodiments of the present disclosure. As shown in FIG. 8, a pending queue 810 includes events from Madvise 820, these events may be subjected to internal memory labeling via Madvise, and rectangles having the same color/pattern represent events from the same application process.

Afterwards, in a scanning queue 830, events from different applications may be divided into different application groups (Group 0 to Group N). As shown in FIG. 8, a group 0 may be a default group, including different processes (instances) from a plurality of applications. The groups 1, 2, 3, . . . N may each correspond to different processes of one application. In other words, six blocks in the group 1 may represent six similar application instances of an application 1, base tree extraction may be performed for one instance (block), the extracted base tree is applied to respective internal memory sorting of each of the six blocks, and then KSM internal memory merging is performed on the six blocks. Similarly, the similar operation as in the group 1 may be executed on the groups 2, 3, . . . N.

Figure 9:
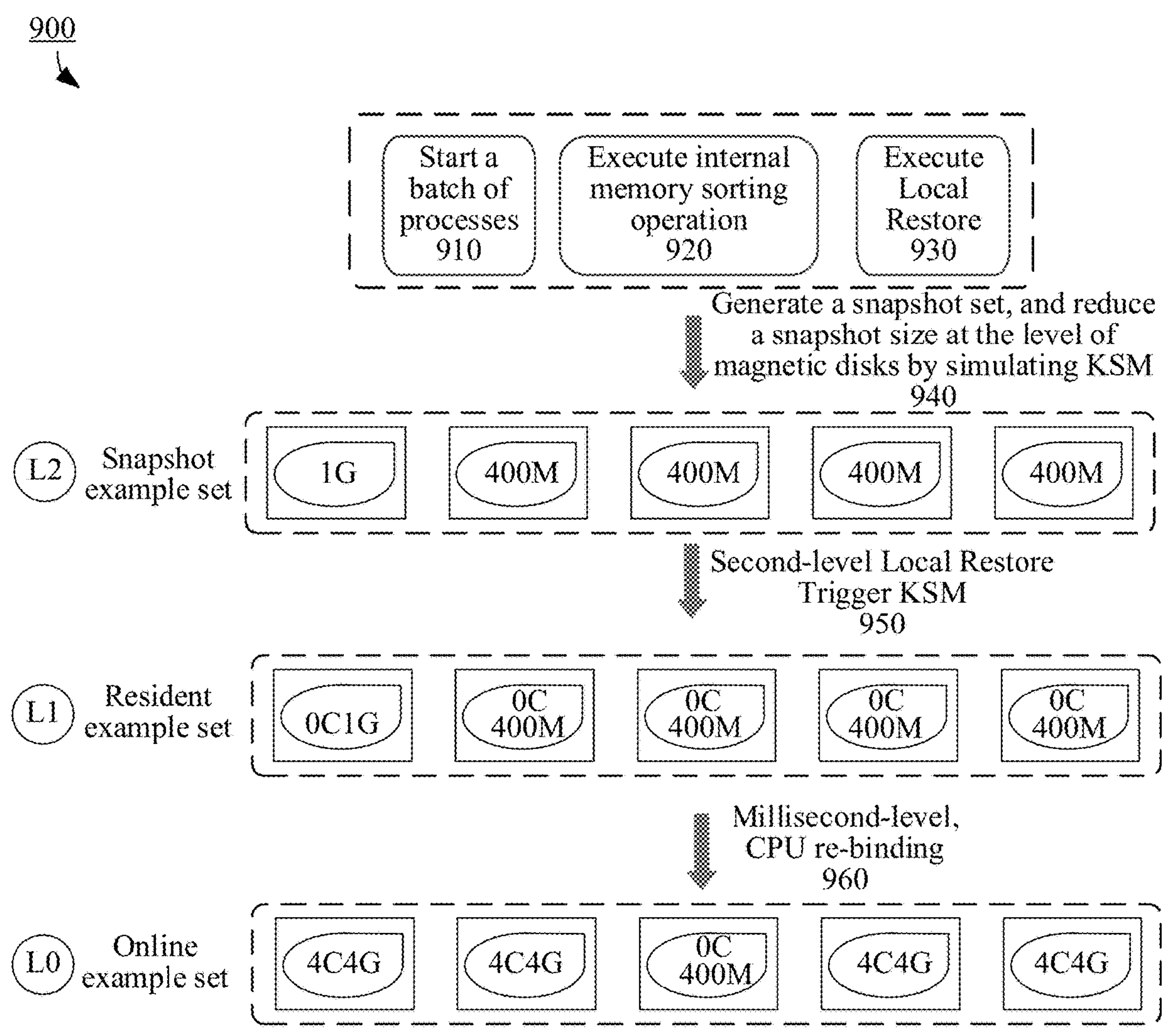
FIG. 9 shows an exemplary instance of direct state conversion of different types of application instances, according to some embodiments of the present disclosure.

By utilizing the above whole set of internal memory sorting strategies, a plurality of JVM instances survived in cold-starting may share the maximum internal memory as much as possible, and the resource cost of surviving cache instances is lowered. In some embodiments, a set of multi-level cache elastic scheme may be further provided by utilizing a 1:1 snapshot technical solution. FIG. 9 shows an exemplary instance 900 of direct state conversion of different types of application instances, according to some embodiments of the present disclosure.

L2, L1 and L0 represent different types of states of the same instance. L0 is an application instance set which receives flow normally, namely a set of instances that are in an online state and may receive full flow. L1 is a set of instances in a standby state after the internal memory sorting and merging operations of the present disclosure. L2 is an instance set in which instances in a standby state are made to snapshots by, for instance, utilizing a Checkpoint/Restore technology.

In addition, resources occupied by the online instances (full flow state) L0 are "4C and 4G", namely 4-core (CPU) and 4G internal memory, and the required extra cost is 0. Resources occupied by the low power consumption instances (low power consumption state) L1 are "OC and 400 M", namely 0-core (not occupying a CPU) and 400 M internal memory, and the required extra cost is CPU: OC * the number of instances, internal memory: 400 M * the number of instances. Resources occupied by the snapshot instances L2 are "400 M", namely 400 M internal memory, and the required extra cost is storage: 400 M * the number of instances, bandwidth: 400 M * the number of instances.

As shown, in the case of combining the snapshot ability, a batch of processes (for instance, a plurality of similar application instances of the same application) may be started 910 first, the above internal memory merging sorting operation is executed 920 (e.g., a series of operations shown in FIG. 7), and a snapshot operation (1:1 snapshot, that is, one instance, one snapshot) is performed on standby surviving instances after internal memory merging by utilizing, for instance, the Checkpoint/Restore technology 930. Therefore, a snapshot instance set in the state L2 is obtained (for instance, generating a snapshot set, and reducing the snapshot size at the level of magnetic disks by simulating KSM 940). Afterwards, the state L1 may be reached by utilizing a local restore technology and utilizing KSM 950. Afterwards, millisecond-level restore to the online state L0 is achieved through CPU re-binding 960.

During first starting, the state L1 may be reached directly by executing the above internal memory merging sorting operation (e.g., a series of operations shown in FIG. 7) on a cold-starting process. Afterwards, millisecond-level restore to the online state L0 is achieved through CPU re-binding.

In other words, when a batch of similar application instances are cold-started, the operations as shown in FIG. 7 may be directly executed on the application instances to convert the cold-started instances occupying the "4G" internal memory to the standby state (i.e., state L1) occupying the "400 M" internal memory. Afterwards, a full flow receivable state of the similar application instances may be restored based on an expansion instruction, namely, directly restoring from the state L1 to the online state L0 of "4C4G".

When it is required to restore from the full flow state to the lower power consumption state (i.e., contraction after expansion), internal memory sorting may be performed on the instances in the online state, a plurality of application instances subjected to internal memory merging are made to a snapshot, thereby obtaining the state L2, and starting may be carried out via the snapshots to restore to the full flow receivable state of the plurality of application instances. In other words, internal memory sorting results based on the present disclosure may be secondarily utilized by introducing the snapshot technology, so as to avoid continuous cold-starting of the instances. As cold-starting is longer in time than snapshot starting (e.g., 30 s vs 10 s), the starting time can be shortened by making the snapshots during contraction. Further, as for snapshots made from instances subjected to the internal memory sorting operations of the present disclosure, the internal memory arrangements between the instances are consistent, so the sorting operation based on the base tree may be omitted, KSM internal memory merging is directly performed, and the subsequent contraction and expansion efficiency is improved.

In addition, prior to introducing the snapshot technology, the present disclosure is applied to vertical expansion, that is, contraction and a subsequent expansion operation are performed on a plurality of application instances generated by the same machine. After introducing the snapshot technology, the snapshots may be distributed across machines to achieve horizontal expansion of the plurality of application instances.

The application management method and the corresponding internal memory sorting method according to the present disclosure are described above in combination with FIG. 1 to FIG. 9. In some embodiments, the present disclosure may also be implemented as a corresponding application management apparatus or an internal memory sorting apparatus.

Figures 10, 11:
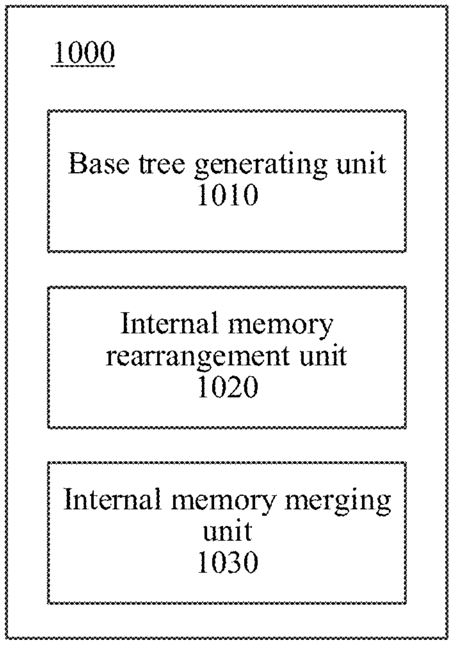
FIG. 10 shows a schematic diagram of composition of an exemplary application management apparatus, according to some embodiments of the present disclosure.
FIG. 11 shows a schematic structural diagram of an exemplary computing device that may be used for implementing the above application management or internal memory sorting methods, according to some embodiments of the present disclosure.

FIG. 10 shows a schematic diagram of composition of an exemplary application management apparatus, according to some embodiments of the present disclosure.

As shown, apparatus 1000 includes a base tree generating unit 1010, an internal memory rearrangement unit 1020, and an internal memory merging unit 1030.

Base tree generating unit 1010 includes circuitry configured to collect objects in an application instance used for serverless computing and generate a base tree according to a reference hierarchical relationship of the objects. Internal memory rearrangement unit 1020 includes circuitry configured to perform internal memory object rearrangement on similar application instances according to the base tree. Internal memory merging unit 1030 includes circuitry configured to perform internal memory merging on the rearranged similar application instances. Therefore, the plurality of application instances are made to enter into a low power consumption state.

In some embodiments, the apparatus may further include: a starting unit including circuitry configured to cold-start the similar application instances; and a garbage recovery unit including circuitry configured to perform an in-heap garbage recovery operation on the plurality of application instances and release temporary objects.

In some embodiments, the apparatus may further include: an expansion unit including circuitry configured to restore a full flow receivable state of the plurality of application instances based on an expansion instruction.

In some embodiments, the apparatus may further include: a snapshot making unit including circuitry configured to snapshot the plurality of application instances subjected to internal memory merging into a snapshot, where the expansion unit may include circuitry configured to start via the snapshot to restore to the full flow receivable state of the plurality of application instances.

In some embodiments, the present disclosure may also be implemented as an internal memory sorting apparatus, including: a garbage recovery unit including circuitry configured to perform a garbage recovery operation on an application instance used for serverless computing; an internal memory rearrangement unit including circuitry configured to perform an internal memory object rearrangement operation based on a base tree for the application instance subjected to garbage recovery, where the base tree is generated by collecting objects in the current application instance or similar application instances of the current application instance and according to a reference hierarchical relationship of the objects; and an internal memory merging unit including circuitry configured to perform an internal memory merging operation on the application instance subjected to internal memory object rearrangement.

FIG. 11 shows a schematic structural diagram of an exemplary computing device that may be used for implementing the above application management or internal memory sorting methods, according to some embodiments of the present disclosure.

Referring to FIG. 11, computing device 1100 includes a memory 1110 and a processor 1120.

Processor 1120 may be a multi-core processor or contain a plurality of processors. In some embodiments, processor 1120 may contain a general-purpose main processor and one or more special co-processors, such as a graphics processing unit (GPU), and a digital signal processor (DSP). In some embodiments, processor 1120 may be implemented using a customized circuit, such as an application specific integrated circuit (ASIC) or field programmable gate arrays (FPGA).

Memory 1110 may include various types of storage units, such as a system internal memory, a read-only memory (ROM) and a permanent storage apparatus. The ROM may store static data or instructions required by processor 1120 or other modules of a computer. The permanent storage apparatus may be a read/write storage apparatus. The permanent storage apparatus may be a non-volatile storage device which cannot lose stored instructions and data even after a computer is powered off. In some implementations, a mass storage apparatus (e.g., a magnetic disk or optical disk, and a flash memory) is adopted as the permanent storage apparatus. In some other implementations, the permanent storage apparatus may be a removable storage device (e.g., a floppy disk and a CD driver). The system internal memory may be a read/write storage device or a volatile read/write storage device, such as a dynamic random access internal memory. The system internal memory may store instructions and data required when some or all processors run. In addition, memory 1110 may include a combination of any computer-readable storage medium, including various types of semiconductor storage chips (a DRAM, an SRAM, an SDRAM, a flash memory and a programmable read-only memory), and magnetic disks or optical disks may also be adopted. In some implementations, memory 1110 may include a readable or writable removable storage device, such as a compact disc (CD), a read-only digital versatile disc (e.g., a DVD-ROM and a double-layer DVD-ROM), a read-only blue-ray disc, an ultra density optical, a flash memory card (e.g., an SD card, a min SD card, a Micro-SD card and the like) and a magnetic floppy disc. The computer-readable storage medium does not contain carrier waves or transient electronic signals transmitted in a wireless or wired manner.

Memory 1110 stores executable codes thereon, and the executable codes, when processed by processor 1120, may cause processor 1120 to execute the application management or internal memory sorting methods described above.

The millisecond-level application elastic scheme based on multi-process internal memory sharing according to the present disclosure has been described in detail above with reference to the accompanying drawings. In the present disclosure, by designing the whole set of scheme, and by utilizing the JVM CDS technology, an internal memory heap alignment algorithm and thread stack recovery, with the aid of the KSM internal memory merging technology, a plurality of surviving instances of the same application can occupy extremely few system resources, and millisecond-level elastic expansion of the application instances can be achieved with a low resource cost.

In some embodiments, the method may be completed in a user state completely, compared to cold-starting, which often requires 10 minute level expansion time, the millisecond-level scheme can greatly reduce the cost, improve the flexibility of a scheduling system, and achieve serverless applications.

When there is no service flow, by means of the technical solution, a plurality of surviving instances of an application can be cached with the low resource cost. With the same resources, ten thousands of applications are deployed in a public cloud resource pool, and when there is no flow, the resources may be greatly saved, and the cost may be lowered; and by utilizing the characteristics of surviving objects, services can be provided at a millisecond level when flow comes, and distribution according to needs is truly achieved.

In some embodiments, in the present disclosure, on the basis of achieving internal memory sharing of the plurality of surviving instances by utilizing the internal memory sharing technology, a set of multi-level-cache low-cost millisecond-level elastic scheme may be further constructed in combination with the Checkpoint/Restore snapshot technology, and thus the time and cost for constructing the surviving cache instances are greatly reduced, horizontal expansion is achieved, and scalization becomes possible.

In addition, the method according to the present disclosure may also be implemented as a computer program or computer program product, and the computer program or computer program product includes computer program code instructions used for executing the steps defined in the above method of the present disclosure.

Alternatively, the present disclosure may also be implemented as a non-transitory machine-readable storage medium (or a computer-readable storage medium, or a machine-readable storage medium) on which executable codes (or computer programs, or computer instruction codes) are stored. When executed by a processor of an electronic device (or a computing device, a server, etc.), the executable codes (or computer programs, or computer instruction codes) cause the processor to execute the steps of the above method according to the present disclosure.

Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

The embodiments may further be described using the following clauses:

1. An application management method, comprising:

collecting a plurality of objects in an application instance used for serverless computing and generating a base tree according to a reference hierarchical relationship of the plurality of objects;

performing internal memory object rearrangement on a plurality of application instances according to the base tree; and performing internal memory merging on the plurality of rearranged application instances.

2. The method according to clause 1, further comprising:

cold-starting the plurality of application instances;

performing an in-heap garbage recovery operation on the plurality of application instances; and releasing a temporary object.

3. The method according to clause 2, wherein collecting the plurality of objects in the application instance and generating the base tree according to the reference hierarchical relationship of the plurality of objects comprise:

collecting a plurality of surviving objects in a heap after releasing the temporary object, and generating the base tree according to a reference hierarchical relationship of the plurality of surviving objects.

4. The method according to clause 3, wherein collecting the plurality of surviving objects in the heap after releasing the temporary objects, and generating the base tree according to the reference hierarchical relationship of the plurality of surviving objects, comprises:

collecting a plurality of top-layer objects surviving in the heap as a first layer of the base tree;

collecting plurality of objects that are directly referenced by objects of the first layer as a second layer of the base tree; and repeating the collecting until obtaining a final layer.

5. The method according to clause 4, wherein the base tree comprises an address and a hierarchical relationship of an object; and/or the base tree comprises object meta data of each class area of each layer.

6. The method according to clause 1, wherein the plurality of application instances comprise one application instance in which the plurality of objects are collected and the base tree is generated and a plurality of other application instances similar to the application instance, and performing internal memory object rearrangement on the plurality of application instances according to the base tree comprises:

rearranging data in an internal memory corresponding to each application instance in the plurality of application instances according to the base tree.

7. The method according to clause 6, wherein performing internal memory merging on the plurality of rearranged application instances comprises:

performing internal memory labeling on a plurality of application instances subjected to the internal memory object rearrangement in a designated heap area; and enabling kernel internal memory sharing to trigger internal memory sharing between the plurality of application instances.

8. The method according to clause 1, further comprising:

performing a class data sharing operation on a meta area of the plurality of application instances to perform internal memory sharing across the plurality of application instances.

9. The method according to claim 1, further comprising:

performing frame recovery on a thread of the plurality of application instances.

10. The method according to clause 1, further comprising:

adding various application instances of different applications as the plurality of application instances into an application group; and performing the internal memory object rearrangement and the internal memory merging on the plurality of application instances in each group of a plurality of application groups.

11. The method according to clause 1, further comprising:

restoring a full flow receivable state of the plurality of application instances based on an expansion instruction.

12. The method according to clause 11, wherein the plurality of application instances are a plurality of application instances used for vertical expansion.

13. The method according to clause 11, further comprising:

snapshotting the plurality of application instances subjected to the internal memory merging into a snapshot; and starting the plurality of application instances based on the snapshot to restore the plurality of application instances to the full flow receivable state of the plurality of application instances.

14. The method according to clause 13, further comprising:

distributing the snapshot across machines to achieve horizontal expansion of the plurality of application instances.

15. An internal memory sorting method, comprising:

performing a garbage recovery on an application instance used for serverless computing;

performing an internal memory object rearrangement based on a base tree for the application instance subjected to the garbage recovery, wherein the base tree is generated by collecting objects in the application instance or similar application instances of the application instance and according to a reference hierarchical relationship of the objects; and performing an internal memory merging on the application instance subjected to the internal memory object rearrangement.

16. The method according to clause 15, further comprising:

performing meta area internal memory sharing by utilizing class data sharing;

releasing a stack area internal memory through frame recovery; and exporting codes to perform page cache sharing.

17. The method according to clause 15, further comprising:

re-mapping a merged virtual page as a separate physical page to restore an online state of the application instance.

18. An application management apparatus, comprising:

a base tree generating unit comprising circuitry configured to collect objects in an application instance used for serverless computing and generate a base tree according to a reference hierarchical relationship of the objects;

an internal memory rearrangement unit comprising circuitry configured to perform internal memory object rearrangement on a plurality of application instances according to the base tree; and an internal memory merging unit comprising circuitry configured to perform internal memory merging on same parts of the plurality of rearranged application instances.

19. The apparatus according to clause 18, further comprising:

a starting unit comprising circuitry configured to cold-start the similar application instances; and a garbage recovery unit comprising circuitry configured to perform an in-heap garbage recovery operation on the plurality of application instances and release an temporary object.

20. The apparatus according to clause 18, further comprising:

an expansion unit comprising circuitry configured to restore a full flow receivable state of the plurality of application instances based on an expansion instruction.

21. The apparatus according to clause 20, further comprising:

a snapshot making unit comprising circuitry configured to snapshot the plurality of application instance subjected to the internal memory merging into a snapshot, wherein the expansion unit comprises circuitry configured to start the plurality of application instances based on the snapshot to restore the plurality of application instances to the full flow receivable state of the plurality of application instances.

22. An internal memory sorting apparatus, comprising:

a garbage recovery unit comprising circuitry configured to perform a garbage recovery operation on an application instance used for serverless computing;

an internal memory rearrangement unit comprising circuitry configured to perform an internal memory object rearrangement operation based on a base tree for the application instance subjected to garbage recovery, wherein the base tree is generated by collecting objects in the current application instance or similar application instances of the current application instance and according to a reference hierarchical relationship of the objects; and an internal memory merging unit comprising circuitry configured to perform an internal memory merging operation on the application instance subjected to internal memory object rearrangement.

23. A computing device, comprising:

a processor; and a memory, storing executable codes thereon, the executable codes, when executed by the processor, causing the processor to execute the method of any one of clauses 1 to 17.

24. A non-transitory machine-readable storage medium, storing executable codes thereon, the executable codes, when executed by a processor of an electronic device, causing the processor to execute the method of any one of clauses 1 to 17.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. An application management method, comprising:

collecting a plurality of objects in an application instance used for serverless computing;

generating a base tree according to a reference hierarchical relationship of the plurality of objects;

performing internal memory object rearrangement on a plurality of application instances according to the base tree, wherein:

the plurality of application instances comprise one application instance in which the plurality of objects are collected and the base tree is generated and a plurality of other application instances similar to the application instance, and performing internal memory object rearrangement on the plurality of application instances according to the base tree comprises rearranging data in an internal memory corresponding to each application instance in the plurality of application instances according to the base tree; and performing internal memory merging on the plurality of rearranged application instances.

2. The method according to claim 1, further comprising:

cold-starting the plurality of application instances;

performing an in-heap garbage recovery operation on the plurality of application instances; and releasing a temporary object.

3. The method according to claim 2, wherein collecting the plurality of objects in the application instance and generating the base tree according to the reference hierarchical relationship of the plurality of objects comprise:

collecting a plurality of surviving objects in a heap after releasing the temporary object, and generating the base tree according to a reference hierarchical relationship of the plurality of surviving objects.

4. The method according to claim 3, wherein collecting the plurality of surviving objects in the heap after releasing the temporary objects, and generating the base tree according to the reference hierarchical relationship of the plurality of surviving objects, comprises:

collecting a plurality of top-layer objects surviving in the heap as a first layer of the base tree;

collecting plurality of objects that are directly referenced by objects of the first layer as a second layer of the base tree; and repeating the collecting until obtaining a final layer.

5. The method according to claim 4, wherein the base tree comprises an address and a hierarchical relationship of an object; and the base tree comprises object meta data of each class area of each layer.

6. The method according to claim 1, wherein performing internal memory merging on the plurality of rearranged application instances comprises:

performing internal memory labeling on a plurality of application instances subjected to the internal memory object rearrangement in a designated heap area; and enabling kernel internal memory sharing to trigger internal memory sharing between the plurality of application instances.

7. The method according to claim 1, further comprising:

performing a class data sharing operation on a meta area of the plurality of application instances to perform internal memory sharing across the plurality of application instances.

8. The method according to claim 1, further comprising:

performing frame recovery on a thread of the plurality of application instances.

9. The method according to claim 1, further comprising:

instances various application instances of different applications as the plurality of application instances into an application group; and performing the internal memory object rearrangement and the internal memory merging on the plurality of application instances in each group of a plurality of application groups.

10. The method according to claim 1, further comprising:

restoring a full flow receivable state of the plurality of application instances based on an expansion instruction.

11. The method according to claim 10, wherein the plurality of application instances are a plurality of application instances used for vertical expansion.

12. The method according to claim 10, further comprising:

snapshotting the plurality of application instances subjected to the internal memory merging into a snapshot; and starting the plurality of application instances based on the snapshot to restore the plurality of application instances to the full flow receivable state of the plurality of application instances.

13. The method according to claim 12, further comprising:

distributing the snapshot across machines to achieve horizontal expansion of the plurality of application instances.

14. An apparatus for application management, the apparatus comprising:

a memory configured to store instructions; and one or more processors configured to execute the instructions to cause the apparatus to perform operations comprising:

collecting a plurality of objects in an application instance used for serverless computing and generating a base tree according to a reference hierarchical relationship of the plurality of objects;

performing internal memory object rearrangement on a plurality of application instances according to the base tree, wherein:

the plurality of application instances comprise one application instance in which the plurality of objects are collected and the base tree is generated and a plurality of other application instances similar to the application instance, and performing internal memory object rearrangement on the plurality of application instances according to the base tree comprises: rearranging data in an internal memory corresponding to each application instance in the plurality of application instances according to the base tree; and performing internal memory merging on the plurality of rearranged application instances.

15. The apparatus according to claim 14, wherein the operations further comprise:

cold-starting the plurality of application instances;

performing an in-heap garbage recovery operation on the plurality of application instances; and releasing a temporary object.

16. The apparatus according to claim 15, wherein the operations further comprise:

collecting a plurality of surviving objects in a heap after releasing the temporary object, and generating the base tree according to a reference hierarchical relationship of the plurality of surviving objects.

17. A non-transitory computer readable medium that stores a set of instructions that is executable by one or more processors of an apparatus to cause the apparatus to perform operations comprising:

collecting a plurality of objects in an application instance used for serverless computing and generating a base tree according to a reference hierarchical relationship of the plurality of objects;

performing internal memory object rearrangement on a plurality of application instances according to the base tree, wherein:

the plurality of application instances comprise one application instance in which the plurality of objects are collected and the base tree is generated and a plurality of other application instances similar to the application instance, and performing internal memory object rearrangement on the plurality of application instances according to the base tree comprises: rearranging data in an internal memory corresponding to each application instance in the plurality of application instances according to the base tree; and performing internal memory merging on the plurality of rearranged application instances.

18. The non-transitory computer readable medium according to claim 17, wherein the operations further comprise:

cold-starting the plurality of application instances;

performing an in-heap garbage recovery operation on the plurality of application instances; and releasing a temporary object.

19. The non-transitory computer readable medium according to claim 18, wherein the operations further comprise:

collecting a plurality of surviving objects in a heap after releasing the temporary object, and generating the base tree according to a reference hierarchical relationship of the plurality of surviving objects.

* * * * *